Feb. 9, 1960 J. H. GEISSE 2,924,028
SYNTHETIC FLIGHT TRAINERS
Filed Jan. 10, 1958 4 Sheets-Sheet 1
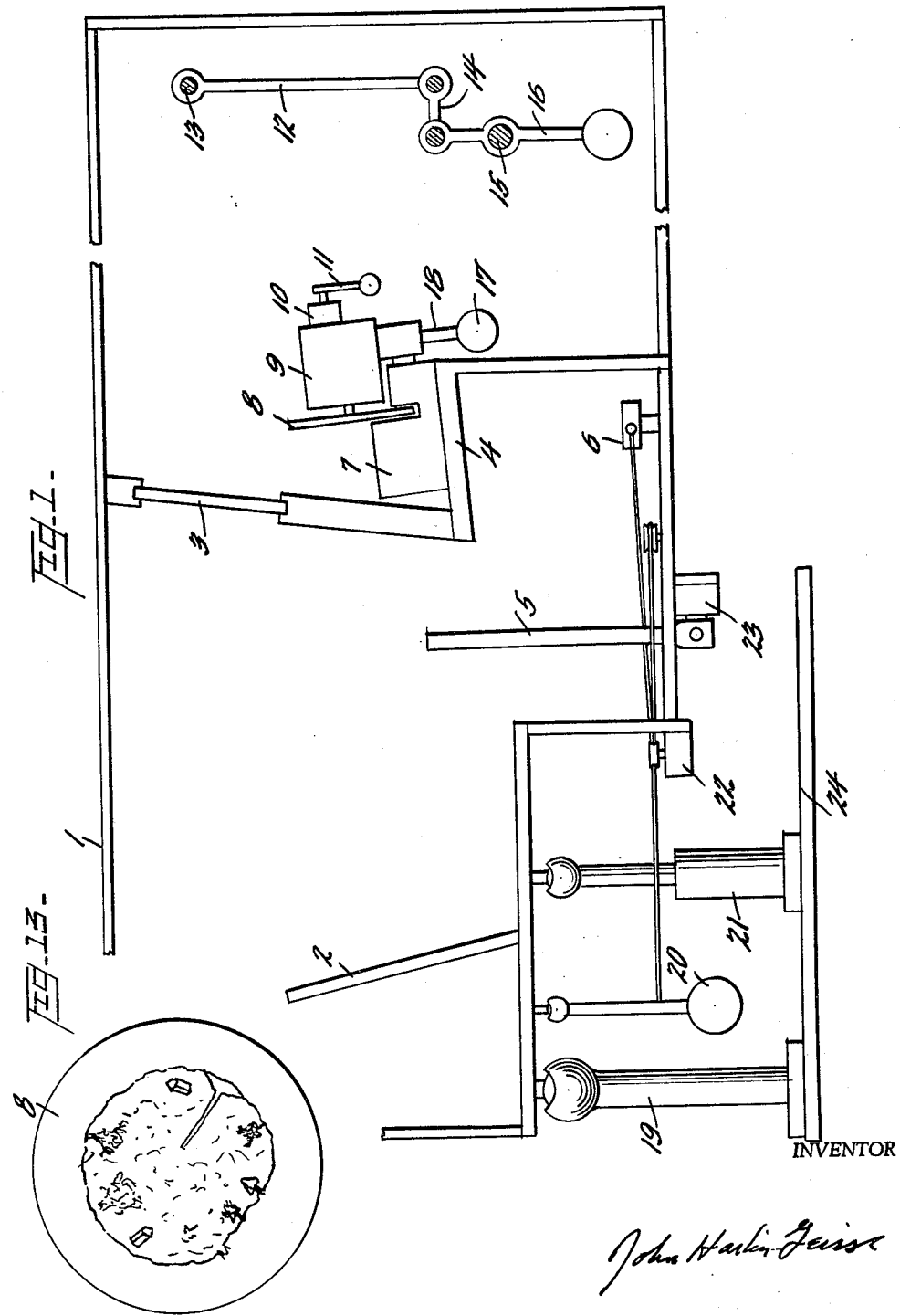
INVENTOR
John Harlin Geisse Feb. 9, 1960 J. H. GEISSE 2,924,028
SYNTHETIC FLIGHT TRAINERS
Filed Jan. 10, 1958 4 Sheets-Sheet 2
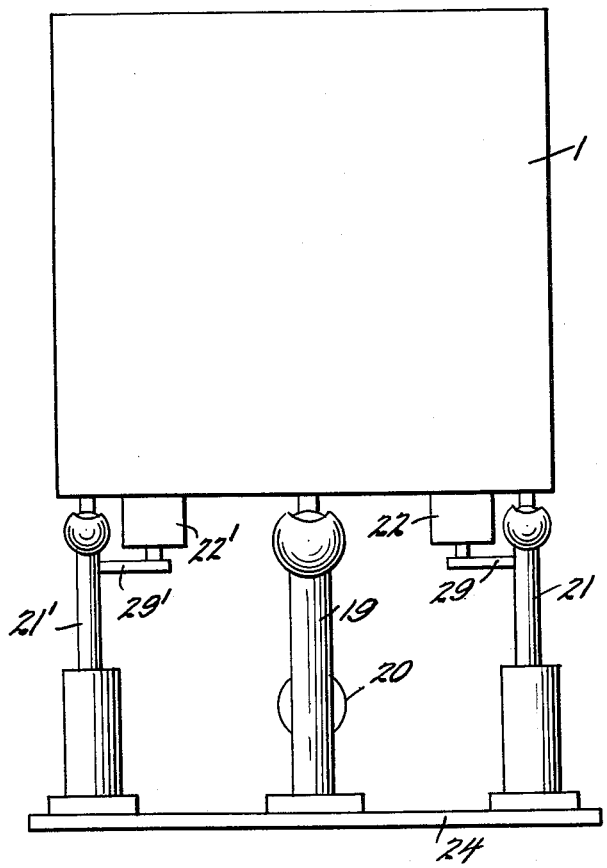
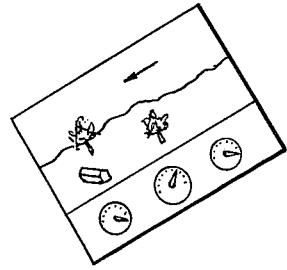 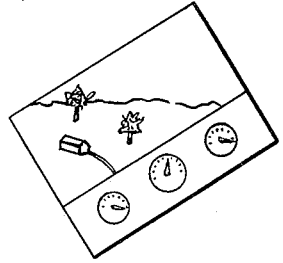 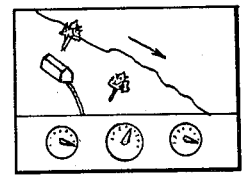
INVENTOR
John Harlin Geisse Feb. 9, 1960 J. H. GEISSE 2,924,028
SYNTHETIC FLIGHT TRAINERS
Filed Jan. 10, 1958 4 Sheets-Sheet 3
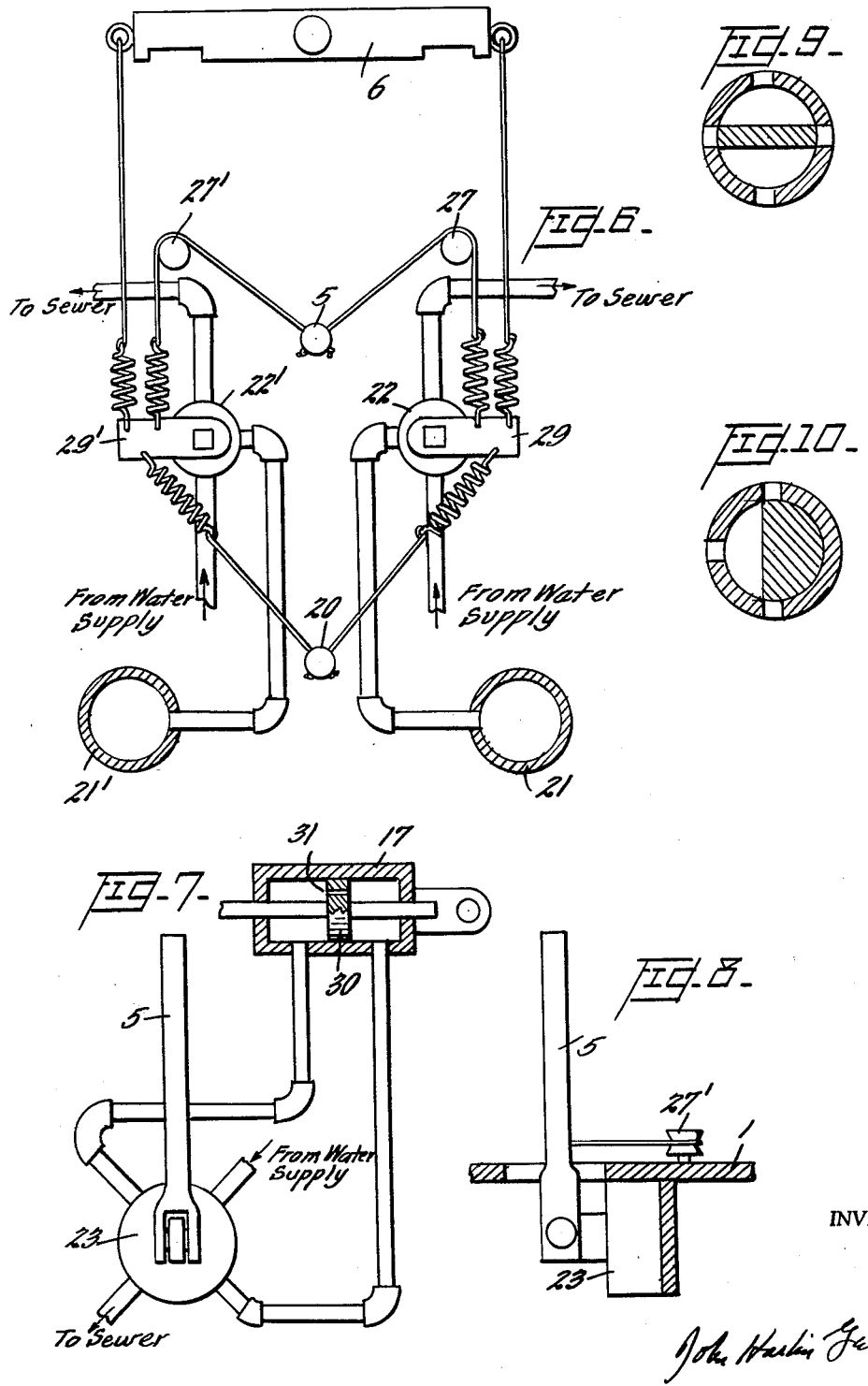
INVENTOR
John Harlin Geisse

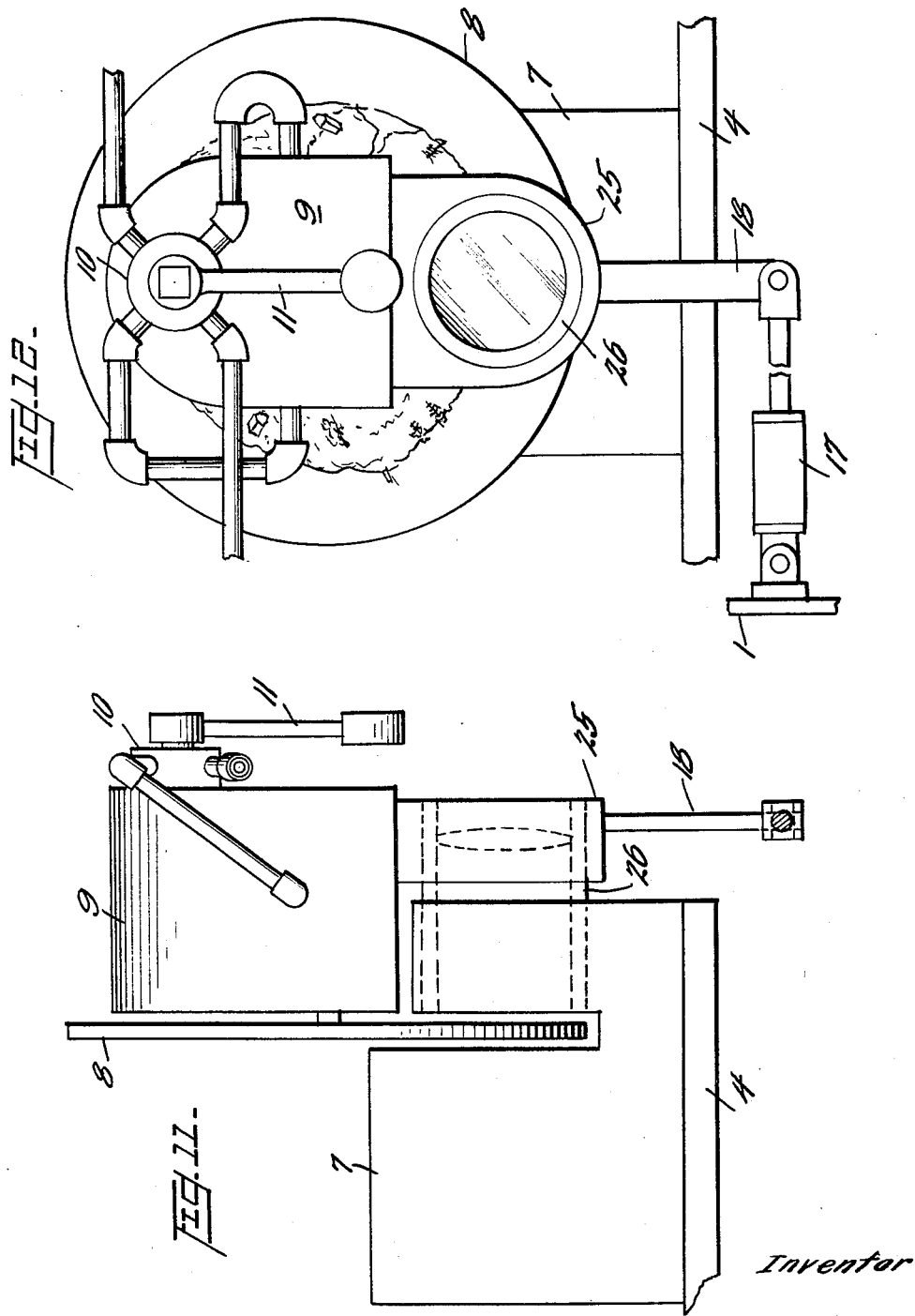

United States Patent Office 2,924,028
Patented Feb. 9, 1960

2,924,028

SYNTHETIC FLIGHT TRAINERS

John Harlin Geisse, Washington, D.C.

Application January 10, 1958, Serial No. 708,168

8 Claims. (Cl. 35—12)

My invention relates to synthetic flight trainers and has for its objective an improvement in the performance of such trainers with particular reference to those coming within the cope of my Patent No. 2,323,322 of July 6, 1943.

Patent No. 2,323,322 relates to synthetic flight trainers in which the cockpit rolls to the left with application of right rudder and to the right with application of left rudder for the purpose of making the direction of the pull of gravity on the trainee duplicate the direction of the pull of the resultant of centrifugal force and gravity on the pilot of an airplane.

By this reversal of the customary relationship between the direction of cockpit roll and the direction of rudder displacement I overcame the deficiency in previous synthetic flight trainers in that they failed to provide the proper weight balance clues to correct co-ordination of the airplane's controls. However in so doing I introduced the possibility of an equally serious deficiency in failing to supply the trainee with proper visual clues.

In my present invention I provide the trainee with proper weight balance clues and with proper visual clues synchronized therewith and in so doing I provide a trainer which more closely simulates the performance of an airplane than any other non-translatable trainer heretofore available.

For this purpose I provide an entirely closed cockpit operated in accordance with my Patent No. 2,323,322 and add thereto a translucent windshield onto which I project a picture which duplicates the picture which a pilot would see through the front window of an airplane.

In the turn of an airplane the force acting on the airplane and the pilot is the resultant of gravity and centrifugal force. Since the latter is a function of the rate of turn, the inclination of the resultant to the horizon is also a function of the rate of turn. To simulate this flight condition in the trainer in which the direction of the force is not controllable, the simulated horizon is inclined to the horizontal so that its angle relative to gravity is the same as the angle between the horizon and the resultant force in an airplane for the rate of turn being simulated.

Figs. 1, 2, 6, 7, 8, 9 and 10 of the accompanying drawings illustrate one embodiment of my invention.

Fig. 1 is a side elevation of the trainer with the side wall removed and Fig. 2 is a rear elevation.

Figs. 3, 4 and 5 illustrate the inclination of the cockpit as shown by the instrument panel and of the horizon which would be presented to the operator simultaneously in the simulations of a flat, skidded turn, a side slip and a correctly executed turn respectively.

Fig. 6, from which parts have been omitted for clarity, shows the manner in which the valves controlling the pitching and rolling of the cockpit are actuated.

Fig. 7 shows the manner in which the valve controlling the rolling of the horizon in the projected picture is actuated.

Fig. 8 shows the method of attaching the elevator and aileron control stick to the valve controlling the rolling of the horizon.

Figs. 9 and 10 are sectional views showing the two types of valves which are used.

Figs. 11 and 12 show the picture projecting mechanism and the manner in which the valve controlling the rate of translation of the picture across the windshield is actuated.

Fig. 13 shows a slide for projecting the horizon.

In Figs. 1 and 2, 1 is the fully enclosed cockpit in which 2 is the back of the trainee's seat. The numeral 3 is a translucent windshield on which the picture is projected by the conventional lantern slide projector 7 which is mounted on the inclined shelf 4.

The picture is projected forward onto the mirror 12 which reflects it back onto the windshield 3. The mirror 12 is mounted on the shaft 13 for fore and aft swinging motion controlled by the pendulum 16 through the linkage 14. The pendulum 16 is mounted on shaft 15 to permit fore and aft swinging.

The numeral 5 is the elevator and aileron stick which is pivotably mounted on the core of valve 23 for operation thereof and to permit fore and aft movement.

The numeral 6 is the rudder pedal which co-operates in actuating valves 22 and 22' which control the flow of fluid to and from the jacks 21 and 21'. The numeral 20 is a pendulum supported by a universal joint attached to the cockpit 1 to provide additional control of the actuation of valves 22 and 22'.

The cockpit 1 is supported on the pedestal 19 through a universal joint and on the two laterally spaced hydraulic jacks 21 and 21'.

In Fig. 6, 6 is the rudder which is connected on each side to one of the valve actuating levers 29 and 29' by cords and springs. The elevator and aileron control stick 5 is also connected to the levers 29 and 29' by cords and springs after the former pass over the pulleys 27 and 27' fastened to the cockpit floor. The numeral 20 is the pendulum supported from the cockpit body and it also is connected to the levers 29 and 29' by cords and springs.

The valves 22 and 22' which are of the types shown in Fig. 10 are so installed that forward movement of the levers 29 and 29' will connect the jacks 21 and 21' respectively to the city water main and rearward movement will connect them with the sewer.

The operation of the cockpit roll and pitch control is as follows:

Fig. 6 portrays the condition which would exist with the cockpit level fore and aft and laterally with the rudder and the elevator-aileron controls in neutral position. The valves 22 and 22' are closed.

It will be evident that if right rudder is applied it will move lever 29 forward and connect the right hand jack 21 to the city water supply and simultaneously permit lever 29' to move backward and connect the left hand jack 21' to the sewer. This will cause the cockpit to roll to the left. However, as the cockpit rolls to the left pendulum 20 will move to the left with respect to the levers 29 and 29' and in so doing will at some definite angle of cockpit roll exactly counteract the effect of the right rudder movement. The valves will then close and the cockpit will remain at this definite angle of roll until the rudder or some other control is moved.

It will also be apparent that left movement of the control stick 5 will result in identical performance to right movement of the rudder.

If the control stick 5 is moved backwards it will move both levers 29 and 29' forward and connect both jacks 21 and 21' to the city water supply. This will cause the cockpit to pitch up. However, as the cockpit pitches up the pendulum 20 will move back relative to the levers 29 and 29' and in doing so will at some definite angle of pitch up exactly counteract the effect of the backward stick movement. The valves will then close and the cockpit will remain in this pitched up attitude until the stick is again moved.

It will also be apparent to one skilled in the art that if right rudder is used with the correct amount of right control stick movement the effect of one will counteract the effect of the other and the cockpit will remain level.

In Figs. 11 and 12, 7 is a standard lantern slide projector. In place of the usual lantern slides there is a circular slide 8 which is a photographic plate having a picture thereon as shown in Fig. 13. The picture is the equivalent of that which would be obtained with a 360 degree sweep of a panoramic camera but the horizon therein is approximately a circle. Only a small portion of the total picture is projected at any one time.

Slide 8 is mounted on the axle of hydraulic motor 9, which may be a conventional gear pump, for rotation around its center, and motor 9 is rotationally mounted on axle 26, which in this case is the lens holder of the projector 7. Rotation of the motor 9, and hence also the slide 8, around the axle 26 is controlled by the hydraulic actuator 17, one end of which is attached to the cockpit 1 and the other to the arm 18 extending down from the journal 25 on which the pump 9 is mounted. It will be apparent that this arrangement of parts provides for the rotation of slide 8, and hence also its horizon, around an axis passing through the center of the slide and about a second axis passing approximately through the horizon.

Since only a small part of the total horizon is projected onto the windshield 3 of Fig. 1, and the horizon is uneven to indicate hills and valleys, the fact that the total horizon is circular will not be readily apparent in that part projected. Rotation of the horizon around its own center will appear therefore to the trainee as a linear movement of the horizon across the windshield 3 and rotation of the slide 8 around an axis passing approximately through the horizon will appear to the trainee as a roll, or bank, of the horizon.

Mounted on the rear of pump 9 is a valve 10 and mounted on the actuating shaft of valve 10 is a pendulum 11. Valve 10, of the type shown in Fig. 9, is so mounted that a clockwise rotation of the pendulum 11 relative to the valve 10 as viewed in Fig. 12 will feed city water into the pump 9 to cause the slide 8 to rotate counter-clockwise.

In Figs. 7 and 8, 23 is a valve attached to the floor of the cockpit 1 and the control stick 5 is pivotably attached to its core. The valve 23 is of the type shown in Fig. 9 and is so installed that left movement of the stick 5 will connect the right side of the hydraulic actuator 17 as viewed in Fig. 7 to the city water supply and the left side to the sewer. This will cause arm 18 to be displaced to the right as viewed in Fig. 12. The piston 30 of the actuator 17 has a small hole 31 therein providing for a slow leakage from one side to the other.

The operation of the picture projection mechanism is as follows:

The rate and direction of the rotation of slide 8 around its own center, and hence the rate and direction of the traversal of the horizon across the windshield 3, is entirely controlled by the angular position of the pendulum 11 relative to the base of the motor 9. Since the pendulum remains vertical and the chord of that part of the horizon projected is always parallel to the base of the motor 9, the rate and direction of the traversal of the horizon across the windshield is directly proportional to the divergence of this part of the horizon from the horizontal.

The rate, direction and degree of rotation of the motor 9 and slide 8 around the axle 26, and hence the inclination of the horizon as seen by the trainee, is directly controllable by him through his control of the flow of fluid to the actuator 17 with the aileron control stick 5 and the valve 23. However, with valve 23 closed, there will be a rotation of motor 9 and slide 8 around axle 26 whenever the base of the motor 9 is displaced from the horizontal by reason of leakage of fluid through the orifice 31 in the actuator piston 30 and the location of the center of gravity of motor 9 and slide 8 above the axle 26.

Before describing the overall performance of the trainer obtained with the mechanisms described above it is advisable to call attention to the fact that the image of a projector is inverted.

Bearing this in mind it will be apparent to one skilled in the art that the above described mechanisms will provide the following performance:

Moving the control stick forward will cause the cockpit to pitch down an amount proportional to the displacement of the control stick and the downward pitch of the cockpit will cause the mirror 12 to tilt to raise the horizon on the windshield.

Moving the control stick to the right with the rudder in neutral position will cause the cockpit to roll to the right an amount proportional to the displacement of the stick and cause a rate of counter-clockwise rotation of the horizon projected on the windshield as seen by the trainee. When the desired angle of bank of the horizon has been reached the control stick will have to be moved back to neutral to close the valves 23 and then slightly beyond neutral to compensate for the leakage through the hole 31 in the actuator piston 30.

Moving the rudder to the right with the control stick in the neutral position will cause the cockpit to roll to the left an amount proportional to the displacement of the rudder. The horizon will at first roll with the cockpit and appear to the trainee as remaining level. It will then continue to roll in the same direction at a rate proportional to the angle of roll of the cockpit and the size of the hole 31 in the actuator piston 30.

In all cases the rate and direction of translation of the horizon across the windshield will be a function of the inclination of the horizon relative to the horizontal which is the equivalent of stating that the inclination of the horizon relative to horizontal will be a function of rate and direction of its translation across the windshield. This is necessary in the trainer in order to make the angle between the horizon and the pull of gravity alone the same as the angle between the horizon and the resultant of centrifugal force and gravity in the operation of an airplane.

It will be apparent to one skilled in the art that many refinements can be added to the basic apparatus described without departing from the scope of the invention claimed herein. It would be a simple matter to provide additional controls of the pitch and roll of the cockpit, such as the throttle for example, in the same manner as provided above for the stick and rudder. Additional valves could also be supplied for delivering liquid to or withdrawing it from the hydraulic actuator 17 controlling the roll of the horizon. It will also be evident to one skilled in the art that electrical or mechanical operation could be substituted for the hydraulic operation chosen to illustrate the invention.

This application is a continuation in part of my prior application Serial No. 231,518, filed June 14, 1951, for Synthetic Flight Trainers, now abandoned.

I claim:

1. The combination in a synthetic flight trainer of a closed cockpit having a simulated windshield and simulated airplane controls, including an aileron and rudder control, means projecting a picture on said windshield, a horizon in said picture, means rolling said horizon to the left with right movement of said aileron control, and means rolling said cockpit to the left with application of right rudder.

2. The combination specified in claim 1 together with means rolling said cockpit to the right with right movement of said aileron control.

3. A combination as specified in claim 2 in which said picture projecting means includes a flat disk on which said picture is placed with the horizon substantially equidistant from the center of said disk.

4. A synthetic flight trainer as described in claim 3 including means rotating said disk around an axis passing through its center and other means rotating said axis around a second axis parallel thereto whose centerline extended would pass substantially through the horizon in said picture.

5. The combination in a synthetic flight trainer of a closed cockpit having a windshield, an aileron control and a rudder control, with means for presenting to the operator a picture through said windshield which would simulate the picture a pilot would see through the windshield of an airplane in flight, said means including means causing said picture to roll to the right with application of left aileron control and to the left with application of right aileron control, means rolling said cockpit to the right with the application of left rudder control and to the left with application of right rudder control, and means causing said picture to traverse across said windshield from left to right when the horizon is rolled to the right and from right to left when said horizon is rolled to the left at rates proportional to the degree of roll of said horizon relative to the horizontal.

6. A synthetic flight trainer including a closed cockpit having a simulated windshield and simulated aileron and rudder controls, means for presenting to the trainee occupying said cockpit a picture through said windshield simulating the picture he would see through the windshield of an airplane, a horizon in said picture, means for rolling said horizon, means for controlling the rate of roll of said horizon by the positioning of said aileron control, means for causing said horizon to traverse across said windshield, means whereby the angle of divergence of said horizon from the horizontal controls its rate of traverse, means for rolling said cockpit laterally, and means whereby the relative displacements of said aileron and said rudder controls will control the degree of roll of said cockpit.

7. A synthetic flight trainer as described in claim 6 in which said means for rolling the horizon and said means for rolling the cockpit are hydraulic means.

8. A synthetic flight trainer including a pictorial display mechanism to simulate what a pilot would see through the front windshield of an airplane including a panoramic picture on a flat disk, a horizon in said picture substantially equidistant from the center of said disk, an axle to which said disk is attached for rotary movement therewith, means for rotating said axle and said disk around an axis passing through the center of said disk, an arm supporting said axle, a second axle supporting said arm and substantially parallel to the first mentioned axle, the centerline of said second axle passing approximately through the horizon of said picture, and means for rotating said arm around said second axle.

References Cited in the file of this patent

UNITED STATES PATENTS

| | | |
|---|---|---|
| 2,323,322 | Geisse | July 6, 1943 |
| 2,369,418 | John | Feb. 13, 1945 |
| 2,409,938 | Hutter | Oct. 22, 1946 |
| 2,518,419 | Dehmel | Aug. 8, 1950 |